(12) United States Patent
Haffert

(10) Patent No.: US 7,815,499 B2
(45) Date of Patent: Oct. 19, 2010

(54) HARVESTER HAVING A TRANSFER MEANS

(76) Inventor: Andreas Haffert, Hermann-Simon-Str. 13, 33334 Gutersloh (DE)

( * ) Notice: Subject to any disclaimer, the term of this patent is extended or adjusted under 35 U.S.C. 154(b) by 0 days.

(21) Appl. No.: 12/185,794

(22) Filed: Aug. 4, 2008

(65) Prior Publication Data

US 2009/0113868 A1    May 7, 2009

(30) Foreign Application Priority Data

Aug. 3, 2007    (DE) .................. 10 2007 036 797

(51) Int. Cl.
*A01F 12/46*    (2006.01)
(52) U.S. Cl. ...................... 460/114; 56/13.3
(58) Field of Classification Search ............. 56/13.3, 56/16.6; 193/6, 14, 23, 29; 222/485, 486
See application file for complete search history.

(56) References Cited

U.S. PATENT DOCUMENTS

| | | | | |
|---|---|---|---|---|
| 2,818,163 A * | 12/1957 | Hilblom et al. | ............. | 198/536 |
| 4,583,905 A * | 4/1986 | Scherr | ......................... | 414/505 |
| 4,930,299 A * | 6/1990 | McBee | .......................... | 56/30 |
| 6,119,847 A * | 9/2000 | Mooney et al. | ............. | 198/632 |
| 6,247,510 B1 * | 6/2001 | Diekhans et al. | ............ | 141/231 |
| 6,908,380 B2 * | 6/2005 | Silver | ......................... | 460/114 |

* cited by examiner

*Primary Examiner*—Alicia M Torres
(74) *Attorney, Agent, or Firm*—Christine Johnson; Johnson & Scaturro, LLC

(57)    ABSTRACT

A harvester (1) comprises an engine and machinery housing (2), a discharge chute (6) which is movably mounted on the engine and machinery mounting (2) and which carries a first outfeed point (7) and a second outfeed point (12) for harvested crop, and at least one deflector for switching a flow of harvested crop from one of the outfeed points (7, 12) to the other.

7 Claims, 5 Drawing Sheets

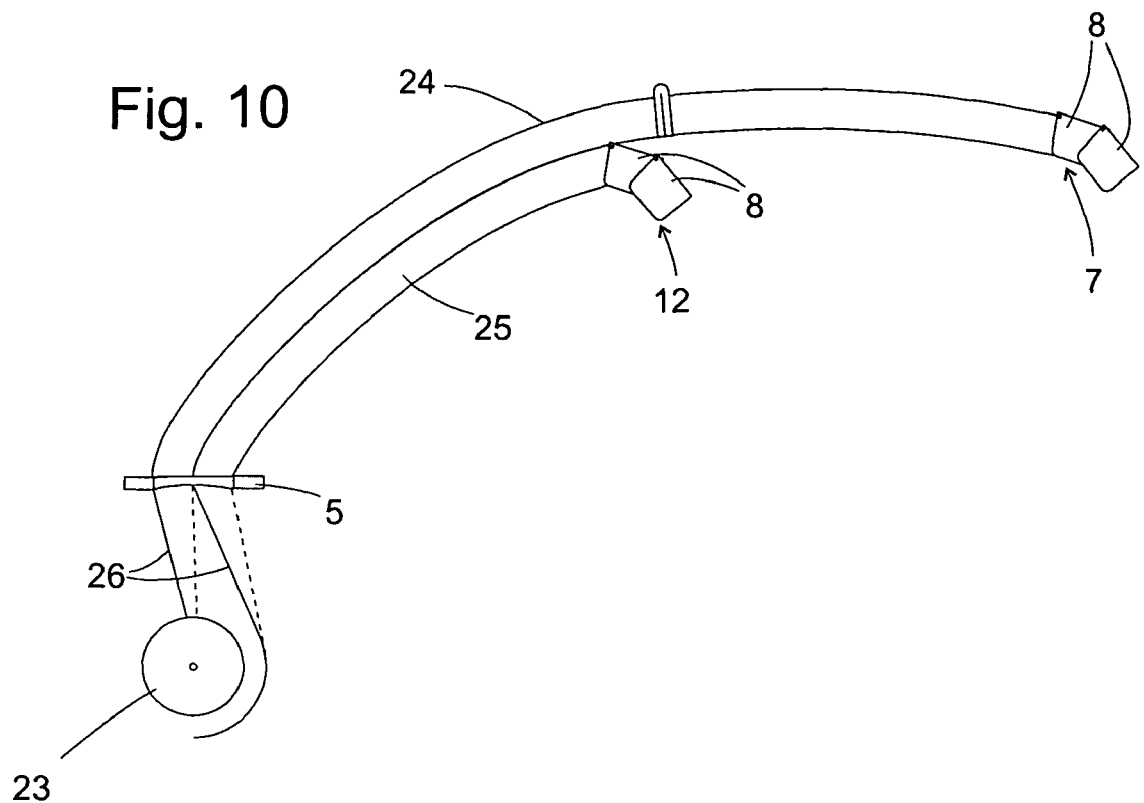
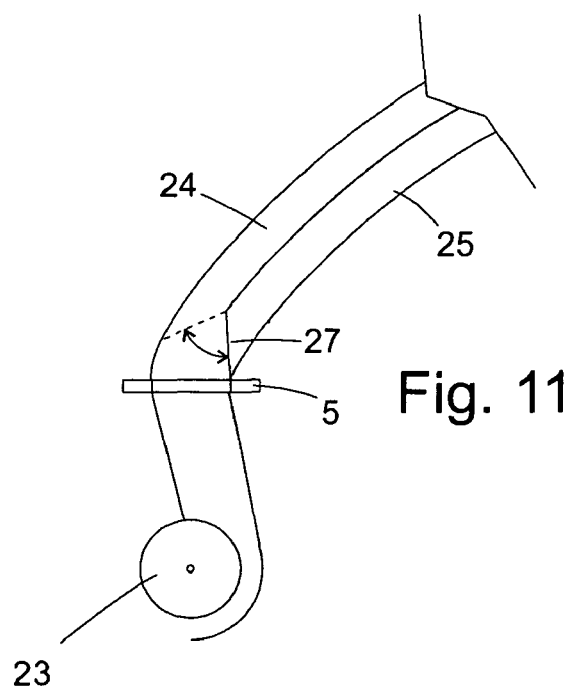

HARVESTER HAVING A TRANSFER MEANS

The present invention claims the benefit of priority to German national application no. 10 2007 036 797.1 filed in the German Patent Office on Aug. 3, 2007.

The present invention relates to a self-propelled harvester having a transfer means for transferring harvested crop from the harvester to a transporting vehicle situated adjacent the harvester. A transfer means of this kind generally comprises what is referred to as a discharge chute, which can be positioned to form a bridge over the side of a transporting vehicle to allow the harvested crop to be emptied into the transporting vehicle's load-carrying space, which is open at the top.

In the case of a harvester which does not have a temporary store of its own for the harvested crop, and in particular in the case of a forage harvester, the problem arises that, when the transporting vehicle is full, the harvester has to stop in order to interrupt the flow of harvested crop from the discharge chute, a fresh transporting vehicle has to take the place of the previous one, and the harvester and the fresh transporting vehicle then have to get moving again in synchronisation. Any break in the harvesting operation which this causes has an adverse effect on its economy. Also, there has to be a high degree of attentiveness on the part of the driver of the harvester, or there has to be communication between him and the drivers of transporting vehicles, to avoid any harvested crop being lost during a change of transporting vehicle.

Known from DE 102 11 706 A1 is a harvester as defined in the preamble to claim 1 in which the discharge chute has two components which can be displaced relative to one another while the harvester is operating and by means of which the length of the discharge chute can be changed. When the harvester and a transporting vehicle are driving next to one another at the same speed and in ideally parallel positions, this discharge chute makes it possible for the point at which the harvested crop strikes the load-carrying surface of the transporting vehicle to be varied, and in this way even distribution of the harvested crop over the load-carrying surface and good use of the volume of carrying space available to be achieved. In this case too, the outfeed of harvested crop from the discharge chute has to be interrupted temporarily to prevent losses of harvested crop when there is a change of transporting vehicle.

DE 2 400 714 discloses a discharge chute which is made up of a plurality of segments which are hinge-connected, to enable them to assume a compact collapsed configuration for travel on the road. It is not possible for harvested crop to be fed out in the collapsed configuration.

German utility model 8 400 173 teaches a tractor/forage harvester unit in which a discharge chute is connected to an outlet nozzle of the forage harvester which is offset from the longitudinal centre plane of the tractor. The discharge chute can be pivoted between a position in which it fills a transporting vehicle directly on the side of the tractor adjacent the outlet nozzle and a position in which it fills a vehicle on the opposite side of the tractor via a section of conduit which is mounted in a fixed position on the tractor and can be coupled to the discharge chute. Here too, without stopping the tractor, it is only possible for the flow of harvested crop to be switched over from one transporting vehicle to another with losses of harvested crop.

It is therefore an object of the present invention to specify a harvester which makes a change between transporting vehicles possible without any interruption in the harvesting operation and substantially without any losses of harvested crop.

The object is achieved by, in a harvester having an engine and machinery housing and having a discharge chute which is movably mounted on the engine and machinery housing and on which a first outfeed point for harvested crop is formed, forming a second outfeed point on the discharge chute and providing means for switching a flow of harvested crop from one of the outfeed points to the other.

To make it possible for the harvested crop to be discharged onto the load-carrying surface of a transporting vehicle in a directed way, a diverting means is usefully provided at each outfeed point to divert downwards a flow of harvested crop passing through the outfeed point. Depending on the embodiment of the invention, this diverting means may be permanently in operation or may be displaceable to a position in which it allows the harvested crop to travel through without being diverted.

In a first embodiment of the invention, there are formed in the discharge chute two adjacent conduits, one of which opens onto the first outfeed point and the other of which opens onto the second outfeed point. To shift the flow of harvested crop from one conduit to the other, the discharge chute can be adjusted at the engine and machinery housing between a position in which an outlet from the engine and machinery housing opens onto one conduit and a position in which it opens onto the other conduit.

A distributor flap may also be provided inside the discharge chute to cause the flow of harvested crop to be applied to one or other outfeed point as desired.

In a preferred refinement, the second outfeed point is arranged between a proximal and a distal section of the discharge chute, and the diverting means at the second outfeed point can be moved between a position in which it diverts the flow of harvested crop downwards and a position in which it allows it through into the distal section. The proximal section of the discharge chute can thus be used to feed harvested crop out both through the first outfeed point and through the second outfeed point.

The diverting means may then comprise, in particular, a flap which, at the second discharge opening, can be pivoted from an upper side of the discharge chute into the interior thereof.

If the second outfeed point is formed in a surface of the discharge chute which is curved in a concave shape, any means for closing off the second outfeed point while the harvested crop is being fed out through the first outfeed point can be dispensed with because, due to its mass inertia, the harvested crop can travel past the second outfeed point and enter the distal section substantially without any of it being lost. If necessary, to reduce weight, the discharge chute can be open between the outfeed points on its concave curved side.

The proximal and distal sections of the discharge chute are usefully pivotably connected. The pivotable connection may, on the one hand, allow the discharge chute to assume a compact configuration for travel on public roads; it may however also serve the purpose of making the second outfeed point able to be used for feeding out harvested crop, which is done by moving the distal section away from in front of it.

To obtain a compact configuration for the discharge chute, the distal section can preferably be pivoted between a position in which it forms an extension of the proximal section and a position in which it is folded back against the proximal section, in particular from above or from the side.

Furthermore, the distal section, and the diverting means at the second outfeed point, may usefully be matched to one another in such a way that they can be moved between a position in which the distal section forms an extension of the proximal section and a position in which the diverting means at the second outfeed point is operative.

Further features and advantages of the invention can be seen from the following description of embodiments which refers to the accompanying drawings. In the drawings:

FIG. 10 is a schematic view from the side of a fifth embodiment of discharge chute.

FIG. 11 shows a modified version of the discharge chute shown in FIG. 10.

Figure 1:
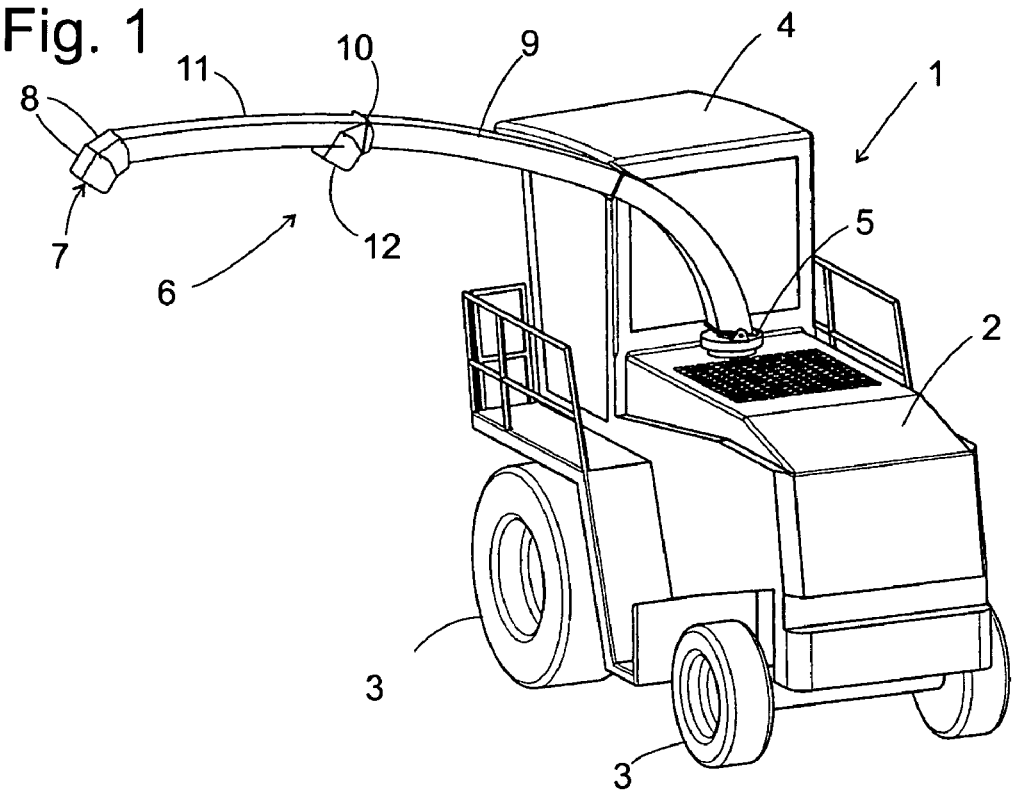
FIG. 1 is a perspective view of a drivable harvester according to the invention showing the discharge chute in a first working configuration.

FIG. 1 is a three-quarter perspective view from the rear of a forage harvester 1 according to the invention. An engine and machinery housing 2 of the forage harvester 1 contains an engine to drive the wheels 3 and also a front-mounted harvesting attachment (not shown in the Figure) which can be mounted at the front end of the forage harvester 1. Harvested crop which is picked up from the ground with the help of the front-mounted harvesting attachment is comminuted in a chopping drum (which cannot be seen in the Figure) which is arranged inside the engine and machinery housing 2 below a driver's cab 4 and is fed out into a discharge duct which rises behind the driver's cab 4. A re-accelerator 23, which is likewise arranged inside the housing 2, at the discharge duct, hurls the chopped harvested crop through a discharge chute 6 which is mounted on a ring mounting 5 at the top face of the engine and machinery housing 2 to be rotatable about a vertical axis.

In the conventional way, the discharge chute 6 has, at its free end, an outfeed point 7 which has a diverting means in the form of a discharge guide having two sheet-metal deflectors 8 which are hinged to one another and to the end of the discharge chute 6 and which are bent into a U-shape. The sheet-metal deflectors 8 can be pivoted by means of positioners (not shown) to control the direction of outfeed of the harvested crop. In the position shown in FIG. 1, the sheet-metal deflectors 8 divert a flow of harvested crop, which emerges from the end of the discharge chute 6 in a substantially horizontal direction, steeply downwards, so that it impacts on a load-carrying surface of a transporting vehicle (not shown) approximately below the outfeed point 7.

The discharge chute 6 is divided into a proximal section 9 which extends from ring mounting 5 to a hinge 10 having a horizontal axis, and a distal section 11 which extends from the hinge 10 to the free end of the discharge chute 6. At the point where the hinge 10 is situated, there is a second outfeed point 12 which is likewise provided with a diverting means for diverting the flow of harvested crop downwards. Various embodiments of a diverting means of this kind will be described in more detail at a later point.

There is space below each of the two outfeed points 7, 12 for a transporting vehicle. While the forage harvester 1 is moving, an empty transporting vehicle can therefore be driven under whichever outfeed point is free; the driver of the forage harvester 1 then switches the flow of harvested crop to this outfeed point and the full transporting vehicle drops back, while the forage harvester 1 and the fresh transporting vehicle which has arrived drive on.

Figure 2:
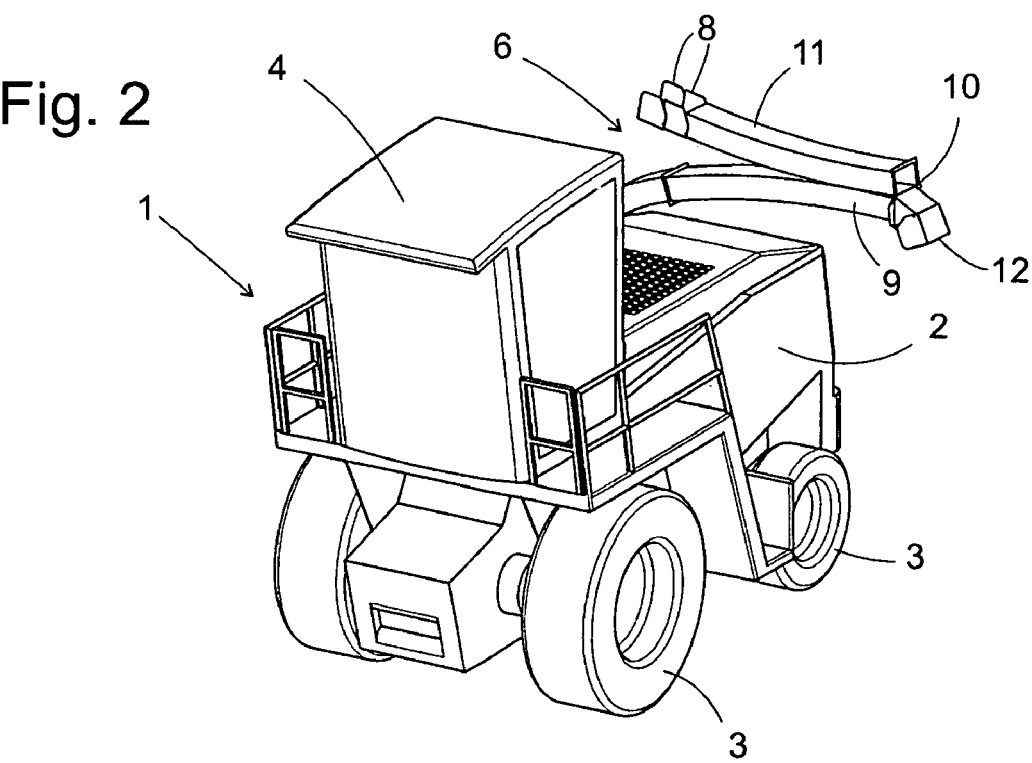
FIG. 2 shows the same harvester with its discharge chute in a second working configuration.

FIG. 2 shows the forage harvester 1 in an alternative operating mode. In this case, the distal section 11 of the discharge chute 6 has been pivoted back over the top of the proximal section 9 at the hinge 10, so that harvested crop can now be fed out, into a transporting vehicle which is driving immediately next to the forage harvester 1, only through the second outfeed point 12.

Figure 3:
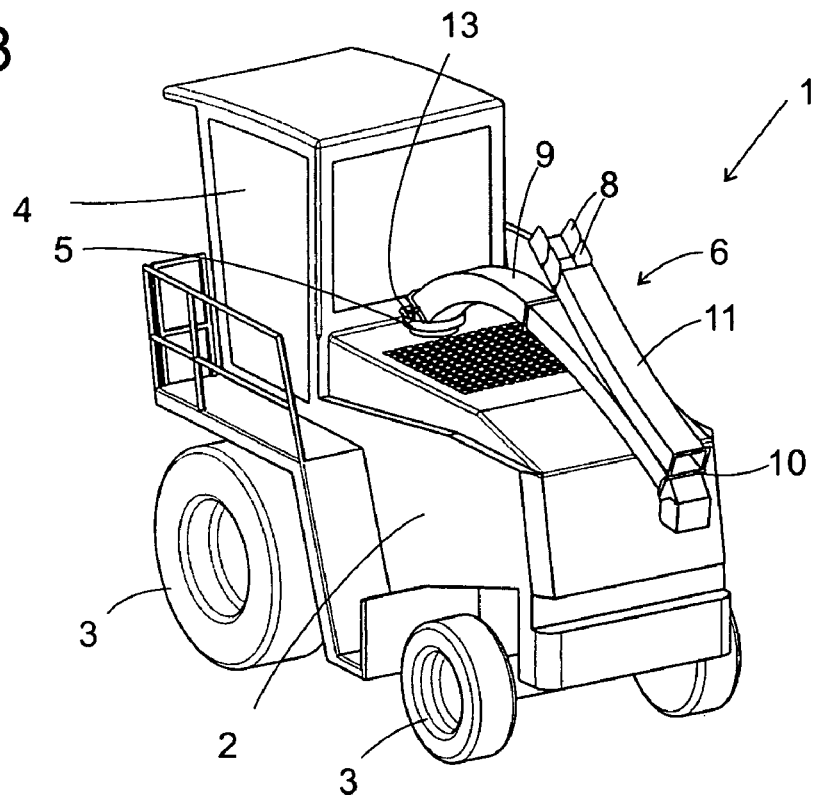
FIG. 3 shows the harvester with its discharge chute in the configuration for travel.

FIG. 3 shows the forage harvester 1 in a configuration for travelling on public highways. In this case too, the distal section 11 of the discharge chute 6 has been pivoted back onto its proximal section 9, so that the discharge chute projects for only a small distance beyond the engine and machinery housing 2, and the entire discharge chute 6 has been lowered at a joint 13 situated on a level with the ring mounting 5 so that it no longer reaches upwards to a point above the roof of the driver's cab 4.

Figure 4:
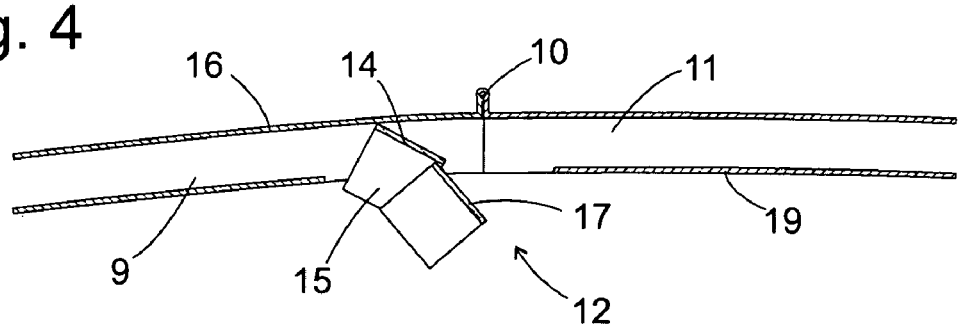
FIG. 4 is a schematic section through part of a first embodiment of discharge chute.

FIG. 4 shows the hinge 10 and the adjacent parts of the sections 9, 11 of a first embodiment of the discharge chute 6. In this case the outfeed point 12 is in the form, in the concave underside of the discharge chute 6, of an opening which is shared by the proximal and distal sections 9 and 11; it could however also be confined to only one of these sections. A first sheet-metal deflector 14 which is bent into a U-shape is pivotably jointed to the top wall 16 of the discharge chute 6. Inside the discharge chute 6, lateral limbs 15 of the sheet-metal deflector 14 extend in close proximity to the side-walls of the discharge chute. A second sheet-metal deflector 17, which is likewise U-shaped, is jointed to the sheet-metal deflector 14 to form an extension thereof. The sheet-metal deflectors 14, 17 form a diverting means which, in the position shown in FIG. 4, blocks the path of the harvested crop into the distal section 11 and diverts it downwards through the opening forming the outfeed point 12.

In a second position (not shown), the sheet-metal deflectors 14, 17 lie flat against the top wall 16 and open a path for the harvested crop into the distal section 11 and to the outfeed point 7. The curvature of the discharge chute 6 at the outfeed point 12 is selected, as a function of the speed of feed of the harvested crop in the discharge chute 6, to be such that the harvested crop will travel past the outlet opening 12 in a ballistic trajectory and all of it will enter the distal section 11. When the harvested crop is being fed out through the outfeed point 7, there are therefore virtually no losses at the outfeed point 12 even when the latter is not closed off.

If the curvature of the distal section 11 is suitably matched to the speed of the harvested crop in the discharge chute, i.e. if the shape of the distal section is substantially a copy of the parabolic trajectory of the harvested crop, then a bottom wall 19 for the distal section 11 can be entirely dispensed with, and the discharge chute will thus be open at its underside from the outfeed point 12 to the outfeed point 7.

Figure 5:
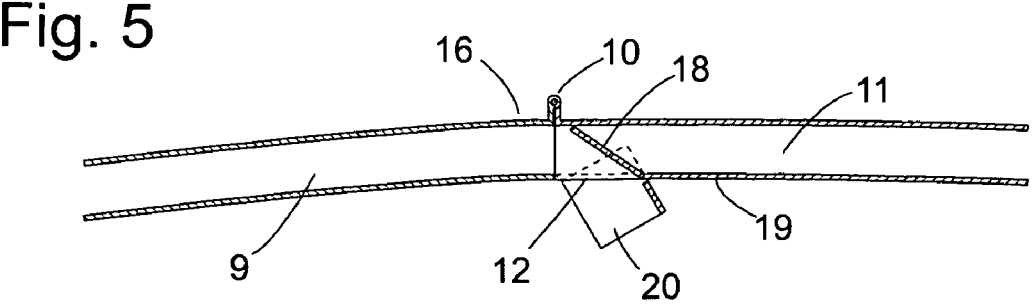
FIG. 5 is a section similar to FIG. 4 through a second embodiment.

In a second embodiment which is shown in section in FIG. 5, the proximal section 9 is closed off on the underside for its entire length and the outfeed point 12 is formed at the upstream end of the distal section 11. A diverting means is formed by a pivotable flap 18 which is jointed to the bottom wall 19 of the section 11 and which, in the configuration shown in FIG. 5, touches the top wall 16. In this way, it blocks the path of the harvested crop to the outfeed point 7, and all of the harvested crop is diverted downwards and fed out at the opening 12 by the flap 18 and a sheet-metal deflector 20.

When the flap 18 is pivoted to a position which is shown as a dashed outline and in which it is flush with the bottom wall 19, it closes off the outfeed point 12, and the entire flow of harvested crop is thus guided onwards to the outfeed point 7. In the embodiments shown in FIGS. 4 and 5, switching of the flow of harvested crop between the openings 7, 12 is possible without the distal section 11 being moved.

Figure 6:
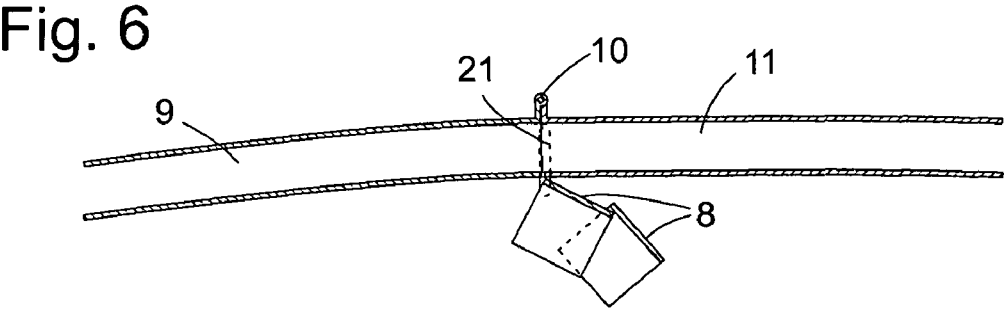
FIG. 6 is a section similar to FIG. 4 through a third embodiment showing it in a first working configuration.
Figure 7:
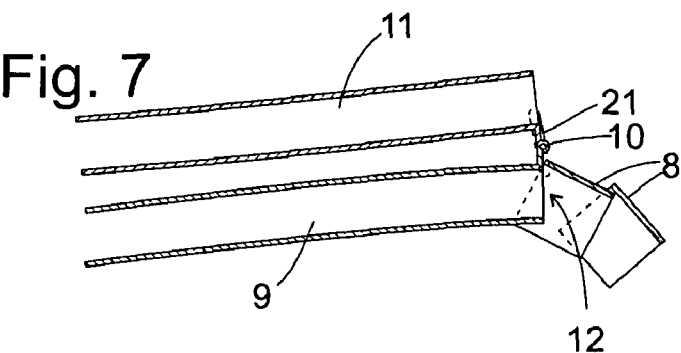
FIG. 7 shows the third embodiment of discharge chute in a second working configuration.

FIGS. 6 and 7 are each views of a third embodiment of the discharge chute 6. In the configuration shown in FIG. 6, the sections 9, 11 follow on directly from one another at the hinge 10, and the harvested crop is fed out at the end of the distal section 11 through the outfeed point 7. A diverting means which, like that at the outfeed point 7, is formed by two U-shaped sheet-metal deflectors 8 is suspended at the end of the proximal section 9 by means of links 21. In the configuration shown in FIG. 6, it does not affect the flow of harvested crop. If however the distal section 11 is folded up and back onto the proximal section 9 at the hinge 10, as shown in FIG. 7, then the sheet-metal deflectors 8 are raised by the links 21 and thus come to rest in front of the end of the proximal section 9, which is now open. The opening at the end of the proximal section 9 thus acts as the second outfeed point 12 at which harvested crop is diverted downwards by the sheet-metal deflectors 8.

Figure 8:
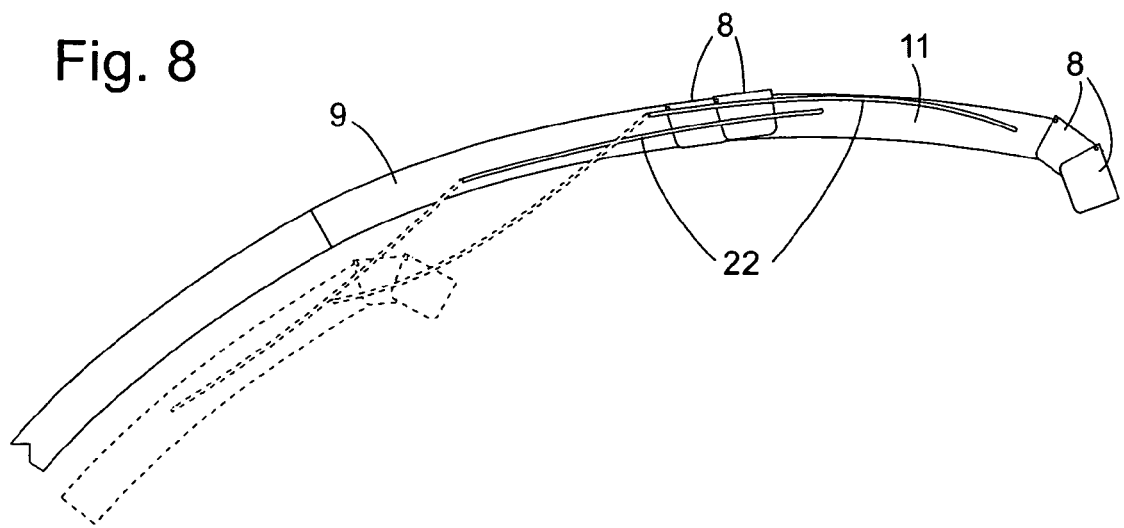
FIG. 8 is a view from the side of a fourth embodiment of discharge chute showing it in a first working configuration.
Figure 9:
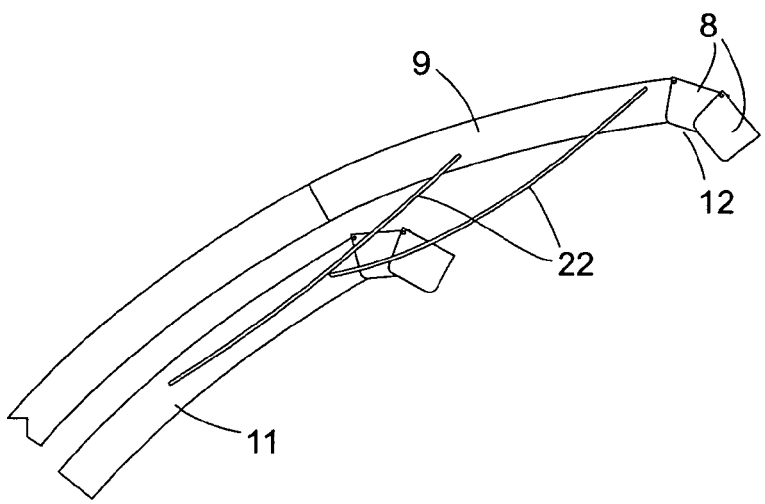
FIG. 9 shows the discharge chute of FIG. 8 in a second working configuration.

A second embodiment in which the distal section 11 has to be moved away from in front of the end of the distal section 9 in order to open the outlet opening 12 there is shown in FIGS. 8 and 9. In FIG. 8, the distal section 11 is held in position in front of the end of the proximal section 9 by two links 22, which means that all the flow of harvested crop crosses into the distal section 11 and is diverted downwards at the free end of the latter by the sheet-metal deflectors 8. Sheet-metal deflectors 8 at the end of the proximal section 9 now rest on the distal section 11 and thus have no effect on the path followed by the harvested crop. For harvested crop to be fed out at the second outlet opening 12, the distal section 11 is pivoted back downwards towards the ring mounting 5 (not shown in the Figures) by means of the links 22 and, as shown in FIG. 9, the sheet-metal deflectors 8 thus hang down at the end of the proximal section 9 and divert the flow of harvested crop downwards.

A fourth embodiment of the discharge chute is shown in FIG. 10, together with the ring mounting 5 and the re-accelerator, which has already been mentioned and is here identified as 23. In this case, the discharge chute 6 comprises two passages 24, 25 which extend next to one another and of which one extends to the outfeed point 7 and the other to the outfeed point 12. The two outfeed points are provided with sheet-metal deflectors 8 which are bent into a U-shape and which hang down. The flow from the re-accelerator 23 made up of the comminuted harvested crop and the air accelerating it can be switched between the passages 24 and 25 by pivotable directing surfaces 26 inside the engine and machinery housing 2 to enable whichever of the openings 7, 12 is desired to be supplied with harvested crop.

In an alternative embodiment which is shown in FIG. 11, the discharge chute 6 once again comprises parallel passages 24, 25 but there are no adjustable directing surfaces 26 inside the engine and machinery housing 2 to direct the flow of harvested crop into one of the two passages 24, 25. Instead, a pivotable flap 27 is arranged in the discharge chute 6 at a point close to the ring mounting to block the path of the flow of harvested crop into one or other of the two passages 24, 25. This solution is simpler in construction than that in FIG. 10, because the axis of pivot of the flap 27 rotates, together with the discharge chute 6, on the axis of the ring mounting 5.

Figure 12:
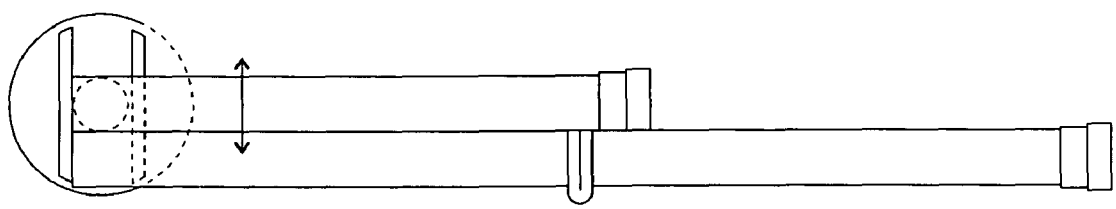
FIG. 12 is a plan view of a sixth embodiment of discharge chute showing it in a first working configuration.
Figure 13:
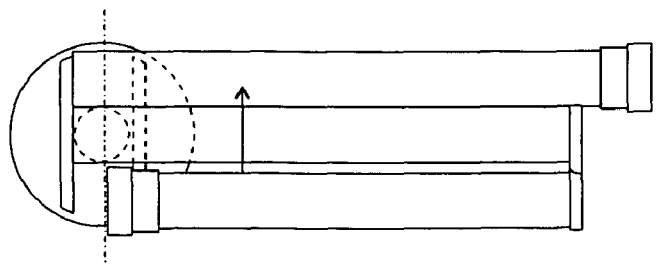
FIG. 13 is a plan view of the discharge chute shown in FIG. 12 in the configuration for travel.

FIGS. 12 and 13 are each plan views of a further embodiment of discharge chute 6 according to the invention. In this case too the discharge chute comprises two passages 24, 25 which extend next to one another but which are arranged side by side with one another. The discharge chute 6 is displaceably guided at the ring mounting 5 in rails 28. In the view shown in FIG. 12, the passage 25 follows on from an aperture 29 passing though the centre of the ring mounting 5, which means that the harvested crop flows through the through-aperture 29 and the passage 25 to the outfeed point 12 at the end of the latter.

The discharge chute 6 is displaceable in the rails 28 to a position in which the passage 24 follows on from the through-aperture 29 and thus supplies the outfeed point 7. The passage 24 is divided into a proximal section 31 and a distal section 32 at a hinge 30. As shown in FIG. 13, the distal section 32 can be pivoted to lie next to the proximal section 31. As shown in FIG. 3, the discharge chute can be lowered towards the top face of the engine and machinery housing 2 by pivoting on an axis 33 situated adjacent the ring mounting 5 to reduce the height of the forage harvester 1 to a size suitable for travel on public roads.

REFERENCE NUMERALS

1 Forage harvester
2 Engine and machinery housing
3 Wheels
4 Driver's cab
5 Ring mounting
6 Discharge duct
7 Outfeed point
8 Sheet-metal deflector
9 Proximal section
10 Hinge
11 Distal section
12 Outfeed point
13 Joint
14 Sheet-metal deflector
15 Limb
16 Top wall
17 Sheet-metal deflector
18 Pivotable flap
19 Bottom wall
20 Sheet-metal deflector
21 Link
22 Link
23 Re-accelerator
24 Passage
25 Passage
26 Directing surface
27 Flap
28 Rail
29 Through-aperture
30 Hinge
31 Proximal section
32 Distal section
33 Axis

The invention claimed is:
1. A harvester comprising:
an engine and machinery housing;

a discharge chute movably mounted on the engine and machinery housing at a proximal section of the discharge chute and comprising:
- a first outfeed point for harvested crop formed upon a distal section of the discharge chute;
- a second outfeed point arranged between the proximal and the distal section of the discharge chute;

diverting means comprising
- a first flap at the first outfeed point, which diverts downwards a flow of harvested crop passing through the first outfeed point, and
- a second flap at the second outfeed point, which in a first position diverts downwards a flow of harvested crop through the second outfeed point; and the second flap pivotable between the first position and a second position flush with an upper side of the discharge chute for allowing the flow of harvested crop through the first outfeed point.

2. Harvester according to claim 1 characterized in that there are formed in the discharge chute two adjacent conduits, one of which opens onto the first outfeed point and the other of which opens onto the second outfeed point.

3. Harvester according to claim 2, characterized in that the discharge chute can be adjusted between a position in which an outlet from the engine and machinery housing opens onto one conduit and a position in which it opens onto the other conduit.

4. Harvester according to claim 1, characterized in that the second outfeed point is formed in a surface of the discharge chute which is curved in a concave shape.

5. Harvester according to claim 1 characterized in that the proximal and distal sections of the discharge chute are pivotably connected.

6. Harvester according to claim 5 characterized in that the distal section can be pivoted between a position in which it forms an extension of the proximal section and a position in which it is folded back against the proximal section.

7. Harvester according to claim 1 characterized in that the distal section, and the diverting means at the second outfeed point, can be moved between a position in which the distal section forms an extension of the proximal section and a position in which the diverting means at the second outfeed point is operative.

* * * * *